Figure 1:
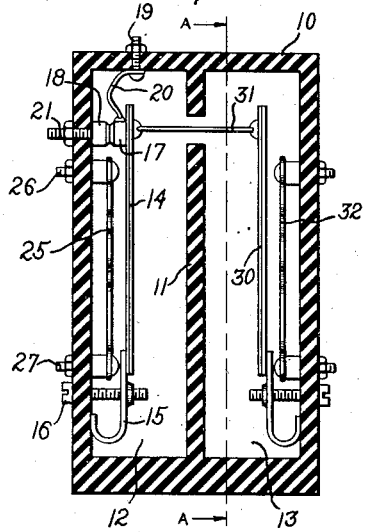

Dec. 29, 1942.   B. W. JONES   2,306,810
PROTECTIVE SYSTEM
Filed Jan. 30, 1941

Inventor:
Benjamin W. Jones,
by Harry E. Dunham
His Attorney.

Patented Dec. 29, 1942

2,306,810

UNITED STATES PATENT OFFICE 2,306,810

PROTECTIVE SYSTEM

Benjamin W. Jones, Schenectady, N. Y., assignor to General Electric Company, a corporation of New York Application January 30, 1941, Serial No. 376,589

14 Claims. (Cl. 175—294)

My invention relates to protective systems and particularly to overload protective systems for dynamo-electric machines such as electric motors and the like.

A simple overcurrent protective relay, while providing adequate overload protection for a motor while running, will not properly protect the same motor when it is stalled. The usual overcurrent relay of the automatically resetting type repeatedly puts the motor back on the line so that it may start up if the overload condition has been removed. If, however, the overload has not been removed, the relay will again operate to remove the motor from the line. Thus a certain amount of energy is repeatedly put into the motor during the intervals when it is reconnected to the source of power.

Since a stalled motor has only about one-third the ventilating capacity of the same motor when running, it is essential that the amount of energy put into a stalled motor during each cycle of an automatically resetting overload device be much less than that periodically put into the same motor when running. An overload protective relay depending upon current response alone has only its inverse time-current characteristic to assist it in distinguishing between a stalled and a running motor. It has been found that such a relay puts too much energy per resetting cycle into a stalled motor.

Another type of service for which my invention is particularly designed is the protection of intermittently rated motors from continuous operation at no-load or partial load. There has been an increasing application to intermittently operating installations of motors which are designed to carry their normal load only intermittently. Such motors are normally over-excited and, having a high flux density, have very high iron losses. The iron losses in the motor produce a heating effect which is directly proportional to the "on" time of the motor. Such a motor is, of course, also heated due to copper losses; and the temperature rise resulting therefrom varies directly as the square of the current and as the "on" time of the motor. Due to the over-excitation of an intermittently rated motor such a motor will become overheated if permitted to run continuously. By a modification of my invention the effect of the no-load heating of an intermittently rated motor may be simulated in a protective relay, whereby continued operation may be prevented.

Accordingly it is an object of my invention to provide a protective system including a circuit controlling device in which the heating effect taking place in a dynamo-electric machine under various conditions may be simulated.

It is a further object of my invention to provide adequate overload protection for a dynamo-electric machine under various conditions of operation and heat dissipation.

It is a still further object of my invention to provide adequate overload protection for an electric motor in both stalled and running conditions.

It is a still further object of my invention to provide adequate protection of a dynamo-electric machine against overheating in both loaded and unloaded conditions.

It is a specific object of my invention to provide an automatically resetting overload protective system for an electric motor which will permit the input of less energy per resetting cycle to the motor when it is stalled than when it is running.

It is also a specific object of my invention to provide a protective system which will prevent the overheating of an intermittently rated electric motor due to continuous operation even at no load.

In order to accomplish the above and other evident objects of my invention the invention itself comprises a device responsive to both the current and voltage of a dynamo-electric machine in which the current and voltage responsive elements are so interconnected mechanically as to simulate the particular condition of heating against which it is desired to protect the motor. By way of example, my invention when applied to the protection of an electric motor against overheating while stalled, may be carried out in one form by providing an element responsive to motor current tending to disconnect the motor from its source of supply and an element responsive to motor voltage opposing the action of the current-responsive element, both elements having inverse time-current operating characteristics. If, on the other hand, it is desired to protect an intermittently rated motor from continuous operation at no load, my invention may be carried out by providing an inverse time-current element responsive to motor current tending to disconnect the motor from its source of supply and an inverse time-current element responsive to motor voltage acting cumulatively with the current responsive element.

My invention is particularly applicable to the motors of air conditioning, refrigeration and similar apparatus which may be mounted in relatively inaccessible positions. While the form of my invention designed to protect a motor against overheating under stalled conditions will not provide no-load protection, it will protect the motor against overload under a variety of conditions and because of its automatic reset feature will render the entire equipment more nearly automatic in its operation. If, on the other hand, stalled motor protection is not particularly essential, it may be desirable, because of the intermittent rating of the motor, to provide the other form of my invention for combined no-load and overload protection. This latter form of my invention may have either automatic or manual reset, as desired.

Figure 2:
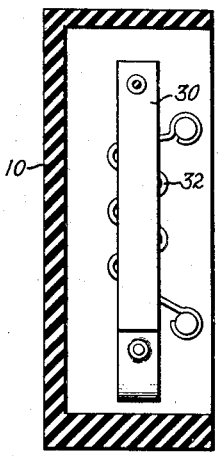
Figure 3:
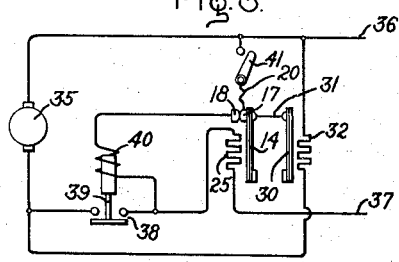
Figure 4:
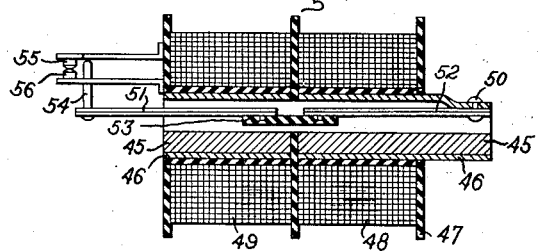
Figure 5:
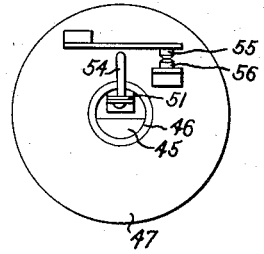
Figure 6:
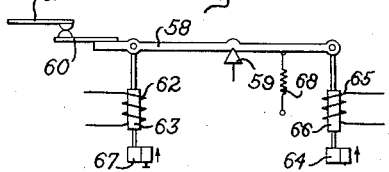

For a more complete understanding of my invention, reference may now be had to the following specification taken in connection with the accompanying drawing in which Fig. 1 is a plan view partly in section of a device embodying my invention in one form; Fig. 2 is a sectional view taken along the line A—A of Fig. 1; Fig. 3 is a simplified circuit diagram of a motor protective system including my invention in the form shown in Figs. 1 and 2; Fig. 4 is a sectional view of a device embodying my invention in a modified form; Fig. 5 is an end view of the device illustrated in Fig. 4, and Fig. 6 is a schematic representation of a device embodying my invention in still another form.

Referring now to the drawing, I have shown in Figs. 1 and 2 a temperature over-load relay mounted in a casing 10 of suitable insulating material. A dividing wall 11 of suitable heat insulating material divides the casing 10 into two compartments 12 and 13. The compartments 12 and 13 are thermally substantially independent of each other. Within the compartment 12 is positioned a thermally responsive element, shown as a bimetallic thermostat 14 mounted upon a U-shaped spring strip 15. One side of the U-shaped member 15 is fixedly mounted upon the casing 10, while the free side of the member 15 carries the bimetallic thermostat 14 and may be adjusted in position by a calibrating screw 16. Mounted upon the free end of the bimetallic thermostat 14 is a movable contact 17 adapted for cooperation with a fixed contact 18 mounted upon the casing 10. A terminal conductor 19 mounted in the casing 10 is electrically connected to the movable contact 17 by a flexible lead 20. The fixed contact 18 is in electrical connection with a terminal conductor 21 mounted in the casing 10.

The bimetallic thermostat 14 is so arranged that when heated it will move toward the right and tend to separate the contacts 17 and 18. In order to heat the thermostat 14 in response to the value of current flowing in the circuit to be protected, a resistance heater 25 is mounted upon a pair of conducting studs 26 and 27 and is positioned directly beneath the thermostat 14 in good heat conducting relation therewith. The studs 26 and 27 provide terminal connections for the heater 25.

Within the compartment 13 is positioned a thermally responsive element, shown as a bimetallic thermostat 30 mounted in a manner similar to that of thermostat 14. The thermostat 30 is rigidly connected to the thermostat 14 through a link 31, preferably of thermal and electrical insulating material. For stalled motor protection the thermostat 30 may be arranged so that it opposes the action of the thermostat 14, i. e., when subjected to an increase in temperature the thermostat 30 moves toward the left and tends to close the contacts 17, 18. With the thermostats 14 and 30 connected in opposing relationship the relay is fully compensated for changes in ambient temperature. For intermittent load protection the thermostat 30 may be reversed so that when heated it moves toward the right to aid the thermostat 14 in opening the contacts 17, 18. For the purpose of heating the bimetallic thermostat 30 in response to the voltage of a circuit to be protected, a resistance heater 32 is mounted in heat conducting relation to the thermostat in a manner similar to that in which the resistance heater 25 is mounted. It will be understood that each of the thermal elements 14 and 30 inherently has an inverse time response with respect to the magnitude of the current flowing in the respective heaters 25 and 32.

Referring now to Fig. 3, I have shown a protective circuit for an electric motor 35 including an overload device of the type illustrated in Figs. 1 and 2. As shown in Fig. 3, the motor 35 may be operatively connected to line conductors 36 and 37 through the contacts 38 of a line breaker 39. The energizing circuit for an operating coil 40 of the line breaker 39 includes the contacts 17 and 18 of the overload device of Figs. 1 and 2 and may include a manually operable switch 41. It will be understood, of course, that if the desired contacts 17 and 18 of the overload relay may be normally open contacts and may be so arranged in the protective circuit that the line breaker 39 is disabled and opens its contacts 38 upon closing of the contacts 17, 18. As shown, however, the line breaker 39 opens its contacts 38 upon the opening of the contacts 17 and 18. The resistance heater 25 is connected in series with the motor 35, while the resistance heater 32 is connected in shunt with the motor 35. With the circuit connections described, both heaters are energized only at such times as the motor 35 is energized.

Let it be assumed that the tendency of the thermostat 14 to open the contacts 17 and 18 in response to the line current through the resistor 25 is opposed by the action of the thermostat 30 in response to the line voltage applied to the resistance heater 32. It will be obvious that the apparatus may be so adjusted that under predetermined conditions of overcurrent through the resistance heater 25 the relay will operate to disable the line breaker 39. The time required for the contacts 17 and 18 to open, and hence the number of watts put into the motor 35 during this interval, is a function of the difference between the wattage output in the resistance heater 25 and the output in the resistance heater 32. Thus, if the bimetallic thermostats 14 and 30 are so adjusted that they balance each other under conditions of rated current and rated voltage, it will be evident that it will take a predetermined time for the contacts 17 and 18 to open in the event that the heater 25 receives, for example, twice its rated current while the heater 32 still receives rated voltage. Thus, if the motor 35 is removed from the line due to an overload while running, and, after resetting of the protective relay, is again set into operation with the overload persisting, the relay will again remove the motor from the line after a time interval determined by the difference in the wattage output of the two heaters. But, since the current of an overloaded running motor is, under the worst conditions, of the order of only two or three times the rated current, the time of the "on" interval will be relatively long. With the relay thus energized for an appreciable time, the effect of the voltage responsive thermostat 32 will be appreciable, and its retarding effect will lengthen the "on" interval.

If now the motor 35 is stalled, as due to a decrease in line voltage or a starting torque demand in excess of its capabilities, the resistance heater 25 will receive many times its rated current because of the low impedance of the motor 35 when at standstill. By way of illustration it has been found that the heater 25 will receive approximately 6 times its rated current, which gives 36 times its rated watts. On the other hand, the voltage responsive heater 32 will be receiving only its rated voltage or less. It will, therefore, be evident that the contacts 17 and 18 will be opened much more rapidly than under running conditions of the motor. This action results from the inverse time-current characteristics of the thermal elements 14 and 30. As a matter of fact, the relay will be energized for such a short time that the effect of the voltage responsive thermostat 30 will be negligible. The absence of a retarding force exerted by the thermostat 30 tends to still further shorten the "on" time interval. As has been previously pointed out, this action is very desirable because of the fact that the ability of the motor 35 to dissipate heat is much less when stalled than when running.

To illustrate the characteristics described in the paragraphs above, let it be assumed that the thermostat 14 will open the contacts 17, 18 upon a 20° C. rise in temperature, and that when the thermostat 30 is heated with line voltage it introduces a 30° C. compensation. Under these conditions when the thermostat 30 is heated continuously the thermostat 14 must have a 50° C. rise in temperature in order to open the contacts 17, 18. Referring now to Fig. 3, let it be further assumed that the motor 35 is stalled. With the connections shown in Fig. 3 the thermostat 30 will be energized only when the motor is energized, which may be of the order of one-fortieth of the total time. This means that the thermostat 30 will receive only one-fortieth of its rated watt-seconds, or one-fortieth of its rated temperature rise, i. e., a 30/40 or .75° C. rise. With the compensation of the thermostat 30 thus reduced the thermostat 14 will open the contacts 17, 18 when it attains a 20.75° C. rise. It will be evident that any desired relationship of temperatures can be obtained.

To illustrate the application of my invention to the protection of an intermittently rated motor, let it now be assumed that the thermostat 30 is reversed, so that its movement under conditions of increased temperature is in the same direction as the movement of the thermostat 14 when heated. By properly proportioning the voltage heating and the current heating of the relay the device can be made to simulate the heating of an intermittently rated motor. For example, the iron losses of an intermittently rated motor do not vary with the load, but are directly proportional to the "on" time of the motor. The heating of the thermostat 30 simulates this condition because this heating effect, being proportional to the voltage across the motor, does not vary substantially with the motor load and is directly proportional to the time during which the motor is energized. The copper losses of the motor, however, are directly proportional to the product of the "on" time of the motor and the square of the line current. It will be apparent that the heating effect upon the thermostat 14, which is heated by line current when the motor is energized, will simulate in the amount of heat generated by the copper losses in the machine. Thus, it will be evident that the relay may be adjusted to trip when the sum of the iron losses and the copper losses in the motor has reached a predetermined value.

Referring now to Figs. 4 and 5, I have shown an induction type of temperature overload relay in which one bimetallic element is heated by a series coil and the other bimetallic element is heated by a shunt coil. As shown, the relay comprises two cores 45 of soft iron cut away to provide apertures for the reception of a bimetallic thermostat assembly. Surrounding each iron core 45 is a tube of conducting material 46 which acts as the short circuited secondary of a transformer. Mounted upon a spool 47 of suitable insulating material and surrounding one core 45 is a series coil 48 of relatively heavy wire. Surrounding the other iron core 45 and also mounted upon the insulating spool 47 is a shunt coil 49 of relatively fine wire. The coils 48, 49 form the primaries of transformers of which the sections of the tube 46 are the secondaries. Mounted within the apertures in the iron cores 45, as by means of a rivet 50, is a compensated bimetallic thermostat assembly comprising a bimetallic thermostat 51 and a bimetallic thermostat 52 connected in opposing relationship by a member 53 of suitable heat insulating material. At the free end of the thermostat 51 is mounted a pin 54 adapted to engage a spring mounted contact 55 to separate it from a cooperating contact 56. The bimetallic thermostat 52 is positioned in heat conducting relation with the iron core 45 which is surrounded by the series coil 48, and is arranged so that an increase in temperature will cause its free end to move upward in a manner tending to separate the contacts 55 and 56. The bimetallic thermostat 51 is located in heat conducting relationship with the iron core 45 which is surrounded by the shunt coil 49, and, for stalled motor protection, is so arranged that an increase in temperature will cause its free end to move downward and tend to permit the contacts 55 and 56 to close. In operation, alternating currents in the series and shunt primary coils 48 and 49, respectively, induce circulating currents in their associated secondaries 46 and these circulating currents generate proportional amounts of heat in the iron cores 45.

It will be evident to those skilled in the art that the device of Figs. 4 and 5 may be connected in a protective circuit similar to that of Fig. 3 by connecting the contacts 55 and 56 in place of the contacts 17 and 18 in Fig. 3 and connecting the coils 48 and 49 in a manner similar to the resistance heaters 25 and 30, respectively. It will also be apparent that for no load protection the thermostat 51 may be reversed so that its deflection when heated is in the same direction as that of the thermostat.

In Fig. 6 I have illustrated my invention as applied to a current and voltage responsive electromagnetic relay. In this figure, I have shown a lever 58 mounted upon a knife edge 59 and carrying a movable contact 60. The movable contact 60 cooperates with a relatively stationary contact 61. For the purpose of separating the contacts 60 and 61 I have shown a series coil 62 operating in conjunction with a magnetic core 63 attached to the lever 58 and opposed by an inverse time delay device 64 attached to the opposite end of the lever 58. For opposing the action of the series coil 62 to obtain stalled motor protection I have shown a shunt coil 65 surrounding a magnetic core 66. The magnetic core 66 is attached to the lever 58 on the opposite side of the knife edge 59 from the core 63. The action of the shunt coil 65 is opposed by an inverse time delay device 67. The relay is biased to the closed circuit position by a tension spring 68.

It will be evident to those skilled in the art that the relay of Fig. 6 may be applied to a protective circuit similar to that shown in Fig. 3 in the same manner as the relay of Figs. 4 and 5 may be applied to such a circuit. It will also be understood that for no-load protection the shunt coil 65 may be arranged to act upon the core 66 in a direction tending to open the contacts 60, 61.

I wish to have it understood that my invention is not intended to be limited by the disclosure in Fig. 3 of a separate switching means 39 controlled by my overload relay. It will be apparent that in a circuit of small capacity, if desired, the contacts 17, 18, or 55, 56, or 60, 61, may be connected directly in the motor circuit.

While I have shown certain preferred embodiments of my invention, it will be understood of course that I do not wish to be limited thereto, as many modifications will occur to those skilled in the art, and I, therefore, contemplate by the appended claims to cover all such modifications as fall within the true spirit and scope of my invention.

What I claim as new and desire to secure by Letters Patent of the United States is:

1. In a protective system for a dynamo-electric machine, means for completing a circuit between said machine and a source of electric supply, a pair of interconnected movable control elements having inverse time-current characteristics and arranged to control said circuit, and means for energizing one of said elements in response to the current in said circuit and the other of said elements in response to the voltage impressed upon said machine thereby to simulate heating conditions within the windings of said machine under various overload conditions and selectively to disconnect said machine from said source of supply in response thereto.

2. In a protective system for an electric motor, means for completing a circuit between said motor and a source of electric supply, a pair of circuit controlling contacts, a pair of interconnected thermally responsive inverse time elements connected to control said contacts, means for heating one of said elements in response to the current flowing through said motor, and means for heating the other of said elements in response to the voltage impressed upon said motor, both said heating means being energized only when said motor is energized.

3. In a protective system for an electric motor, switching means for completing a circuit between said motor and a source of electric supply, a pair of interconnected thermally responsive elements arranged to control said switching means, means for heating one of said elements as a function of the current in said circuit, and means for heating the other of said elements as a function of the voltage impressed upon said motor, whereby conditions of heating in said motor are simulated in said elements and said switching means is disabled under predetermined overload conditions by the combined action of said elements.

4. In a protective system for an electric motor, switching means for completing a circuit between said motor and a source of electric supply, two bimetallic thermostatic elements connected together in cumulative relationship and arranged to control said switching means, means for heating one of said thermostatic elements as a function of the current in said circuit, and means for heating the other of said thermostatic elements as a function of the voltage impressed upon said motor, whereby the combined heating of said pair of bimetallic thermostatic elements simulates the heating of said motor due to the sum of the iron losses and the copper losses therein.

5. In an overload protective system for an electric motor, means for completing a circuit between said motor and a source of electric supply, a pair of circuit controlling contacts, a bimetallic thermostat assembly comprising two thermally independent thermostats mounted in cumulative relationship and disposed to control said contacts, both of said thermostats tending when heated to open said contacts, a core of magnetic material adjacent each of said thermostats, a closed tube of electric conducting material surrounding each of said cores and thermostats, and a current carrying coil surrounding each of said tubes, one of said coils being connected in series with said motor and the other of said coils being connected in shunt with said motor.

6. In a protective system for a dynamo-electric machine, means for completing a circuit between said machine and a source of electric supply, movable time element means having an inverse time current characteristic and arranged for energization in response to the current in said machine to disconnect said machine from said source of electric supply, and second time element means having an inverse time-current characteristic and arranged for energization in response to the voltage applied to said machine to oppose the action of said movable time element means, thereby to simulate heating conditions within the windings of said machine under various overload conditions and selectively to disconnect said machine from said source of supply in response thereto.

7. In a protective system for a dynamo-electric machine, means for completing a circuit between said machine and a source of electric supply, a first thermally responsive element arranged to disable said circuit, a second thermally responsive element arranged to oppose the action of said first element, means for energizing said first element as a function of the current in said circuit, and means for energizing said second element as a function of the voltage across said machine.

8. In a protective system for a dynamo-electric machine, switching means for completing a circuit between said machine and a source of electric supply, two thermostatic elements connected together in opposing relationship and arranged to control said switching means, means for heating one of said thermostatic elements as a function of the current in said circuit, and means for heating the other of said thermostatic elements as a function of the voltage across said machine.

9. In a protective system for an electric motor, switching means for completing a circuit between said motor and a source of electric supply, a compensated thermostatic device for controlling said switching means comprising at least two bimetallic elements, means for heating one of said elements in response to the current in said circuit, and means for heating another of said elements in response to the voltage across said machine.

10. In a protective system for an electric motor, means for completing a circuit between said motor and a source of electric supply, a pair of circuit controlling contacts, a compensated thermally responsive assembly comprising two thermally responsive elements mounted in opposing relationship and disposed to control said contacts, a core of magnetic material disposed adjacent each of said elements, a closed tube of electric conducting material surrounding each of said cores and elements, and a current carrying coil surrounding each of said tubes, one of said coils being connected in series with said circuit and the other of said coils being connected in shunt with said motor.

11. In a protective system for an electric motor, switching means for connecting said motor to a source of electric supply, contacts for controlling said switching means, a compensated bimetallic thermostat assembly comprising two thermally independent thermostats mounted in opposing relationship and disposed to control said contacts, one of said thermostats tending when heated to open said contacts and the other of said thermostats tending when heated to close said contacts, a core of magnetic material adjacent each of said thermostats, a closed tube of electric conducting material surrounding each of said cores and thermostats, a current carrying coil connected in series with said circuit and surrounding that closed tube which embraces the thermostat tending when heated to open said circuit, and a second current carrying coil connected in shunt with said motor and disposed to surround the other of said closed tubes.

12. In a protective system for a dynamo-electric machine, means for completing a circuit between said machine and a source of electric supply, a normally closed switch for opening said circuit to disconnect said motor from said source of supply under predetermined overload conditions, first inverse time element means responsive to the current in said motor and arranged to move said switch to open said circuit, and second inverse time element means responsive to the voltage applied to said motor and connected to said first time element means in opposing relation, whereby when the current in said motor exceeds a predetermined value said switch alternately connects said motor to and disconnects said motor from said circuit for periods of time determined both by the magnitude of said current and the heat dissipating capacity of said motor thereby to distinguish between an overloaded running motor and a stalled motor.

13. In a protective system for an electric motor, means for completing a circuit between said motor and a source of electric supply, a normally closed switch for opening said circuit to disconnect said motor from said source of supply under predetermined overload conditions, electro-magnetic means movable in response to the current flowing through said motor to open said switch, inverse time element means for retarding the movement of said switch in the opening direction, second electro-magnetic means connected for energization in response to the voltage applied to said motor and arranged to oppose movement of said switch under the influence of said first electro-magnetic means, and second inverse time element means connected to restrain movement of said switch in the closing direction, whereby upon the occurrence of a current of predetermined magnitude said motor is intermittently connected to and disconnected from said circuit and the relative lengths of the "on" and "off" periods are proportioned in accordance with the heat dissipating capacity of the motor.

14. In a protective system for a dynamo-electric machine, means for completing a circuit between said machine and a source of electric supply, a normally closed switch for opening said circuit to disconnect said motor from said source of supply under predetermined overload conditions, first inverse time element means responsive to the current in said motor and arranged to move said switch to open said circuit, and second inverse time element means responsive to the voltage applied to said motor and operatively connected to said first time element means for influencing the movement of said switch, whereby when the current in said motor exceeds a predetermined value said switch alternately connects said motor to and disconnects said motor from said circuit for periods of time determined both by the heat generated in said motor and the heat dissipating capacity of said motor.

BENJAMIN W. JONES.